(12) United States Patent
Yoon et al.

(10) Patent No.: US 7,360,941 B2
(45) Date of Patent: Apr. 22, 2008

(54) LIGHT EMITTING DIODE BACKLIGHT AND LIQUID CRYSTAL DISPLAY HAVING THE SAME

(75) Inventors: Ju-young Yoon, Suwon-si (KR); Joo-woan Cho, Seoul (KR); Gi-cherl Kim, Yongin-si (KR); Seok-hyun Nam, Seoul (KR); Sang-yu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 11/376,427

(22) Filed: Mar. 15, 2006

(65) Prior Publication Data

US 2006/0221641 A1  Oct. 5, 2006

(30) Foreign Application Priority Data

Apr. 1, 2005 (KR) ............... 10-2005-0027513

(51) Int. Cl.
*F21V 7/04* (2006.01)
(52) U.S. Cl. ........................ 362/632; 349/58
(58) Field of Classification Search ........ 362/632; 349/58
See application file for complete search history.

(56) References Cited

U.S. PATENT DOCUMENTS 6,508,564 B1 * 1/2003 Kuwabara et al. .......... 362/612

FOREIGN PATENT DOCUMENTS

| JP | 2001-101916 | | 4/2001 |
|----|-------------|---|--------|
| JP | 2001155524 A | * | 6/2001 |
| JP | 2001184918 A | * | 7/2001 |
| JP | 2002093232 A | * | 3/2002 |
| JP | 2004-296372 | | 10/2004 |
| KR | 2001-0051962 | | 6/2001 |

* cited by examiner

Primary Examiner—Hargobind S. Sawhney
(74) Attorney, Agent, or Firm—F. Chau & Associates, LLC (57) ABSTRACT

A backlight unit for use in a liquid crystal display comprises a light guiding plate comprising a light exiting surface, a light reflective surface, and a light incident surface, a light source unit comprising a substrate and a light source disposed on the substrate, wherein the light source unit is disposed to face the light incident surface of the light guiding plate, and a reflecting sheet comprising a first portion facing the light reflective surface of the light guiding plate, a second portion facing the light exiting surface of the light guiding plate, and a third portion connecting the first and the second portions, wherein the third portion comprises light source exposing parts.

22 Claims, 9 Drawing Sheets

LIGHT EMITTING DIODE BACKLIGHT AND LIQUID CRYSTAL DISPLAY HAVING THE SAME

CROSS-REFERENCE TO RELATED APPLICATION

This application claims priority to Korean Patent Application No. 2005-0027513, filed on Apr. 1, 2005, the disclosure of which is incorporated herein by reference in its entirety.

BACKGROUND OF THE INVENTION

1. Technical Field

The present disclosure relates to a liquid crystal display (LCD) device, and more particularly, to an LCD device capable of efficiently dissipating heat generated from a light emitting diode (LED) unit.

2. Discussion of the Related Art

A liquid crystal display comprises an LCD panel having a TFT substrate, a color filter substrate and a liquid crystal layer disposed therebetween. The LCD panel does not emit light by itself. Therefore, a backlight unit is disposed behind the LCD panel for providing light. The trarismittance of the light to the LCD panel depends on the alignment of liquid crystal molecules. The LCD panel and the backlight unit are enclosed within a chassis.

The backlight unit can be an edge type and a direct type. The two types are positioned differently in the backlight unit. The edge type backlight unit is typically employed in smaller-sized LCDs, such as, for example, display screens of laptop or desktop computers or a portable terminal apparatus. The edge type backlight unit comprises a light guiding plate disposed behind the LCD panel, a reflecting sheet disposed behind the light guiding plate, a lamp unit disposed along at least one side of the light guiding plate and providing light to the LCD panel, a lamp holder enclosing and holding the lamp unit, and optical sheets disposed on the light guiding plate for diffusing and focusing the light guided by the light guiding plate.

For the lamp unit, an Electro Luminescence (EL), a Cold Cathode Fluorescent Lamp (CCFL), a Hot Cathode Fluorescent Lamp (HCFL), an External Electrode Fluorescent Lamp (EEFL), or a Light Emitting Diode (LED) may be used.

The lamp holder formed in a 'U' shape encloses the lamp unit and can reduce light loss by reflecting light from the lamp unit to the light guiding plate. To reduce light loss in the opposite direction of the LCD panel, a reflecting sheet may be used and reflect light to the light guiding plate. By using the light guiding plate and the reflecting sheet, light emitted from the lamp unit is transformed to a surface light source incident upon the LCD panel.

When LEDs are used as a light source for the LCD, the LEDs are disposed on a substrate facing an incident surface of the light guiding plate, and the substrate and the LEDs are enclosed inside the lamp holder. As such, the heat generated from the lamp holder is trapped within the holder and is not easily dissipated to the outside.

SUMMARY OF THE INVENTION

Embodiments of the present invention provide an LCD which reflects light from a lamp unit efficiently and dissipates heat from the lamp unit efficiently.

According to an embodiment of the present invention, a backlight unit for use in a liquid crystal display comprises a light guiding plate comprising a light exiting surface, a light reflective surface, and a light incident surface, a light source unit comprising a substrate and a light source disposed on the substrate, wherein the light source unit is disposed to face the light incident surface of the light guiding plate, and a reflecting sheet comprising a first portion facing the light reflective surface of the light guiding plate, a second portion facing the light exiting surface of the light guiding plate, and a third portion connecting the first and the second portions, wherein the third portion comprises light source exposing parts.

The light source may comprise a plurality of light emitting diodes. The light source exposing parts may protrude toward the light incident surface of the light guiding plate. The light emitting diodes may be disposed in the light source exposing parts and an end of each light emitting diode may be aligned with an end of each light source exposing part when the light source unit is combined with the reflecting sheet. At least a part of the light emitting diodes may protrude beyond the light source exposing parts toward the light guiding plate when the light source unit is combined with the reflecting sheet.

The light source exposing parts are configured and dimensioned to seal around the circumference of the light emitting diodes. The light source exposing parts may be formed with holes corresponding to the light emitting diodes, and projections protruding toward the light guiding plate may be formed between each light source exposing part.

The projections may protrude beyond the light emitting diodes when the light source unit is combined with the reflecting sheet. Each of the light emitting diodes may be square shaped, and a corresponding portion of the light source exposing parts may be shaped in a quadrangular pyramid to receive the corresponding light emitting diode. The reflecting sheet may be formed using a mold. The reflecting sheet may comprise a base having aluminum and a coating part comprising a reflective substance, wherein the coating part is formed on the base.

The light source unit may further comprise projections disposed between each light emitting diode. The projections may be disposed facing the incident surface of the light guiding plate and passing through a plurality of holes formed on the third portion of the light guiding plate. The substrate of the light source unit may be coplanar with the incident surface of the light guiding plate.

According to an embodiment of the present invention, a liquid crystal display comprises a liquid crystal display panel on which an image is formed, a light guiding plate comprising a light exiting surface, a light reflective surface, and a light incident surface, a light source unit comprising a substrate and a light source disposed on the substrate, wherein the light source unit is disposed to face the light incident surface of the light guiding plate, and a reflecting sheet comprising a first portion facing the light reflective surface of the light guiding plate and a second portion connected to the first portion, wherein the second portion comprises light source exposing parts.

According to another embodiment of the present invention, a backlight unit for use in a liquid crystal display comprises a reflecting sheet for receiving a light source and a light guiding plate, wherein the reflecting sheet comprises a first portion for receiving a surface of the light guiding plate and a second portion connected to the first portion, and wherein the second portion comprises a plurality of holes to receive and expose the light source.

BRIEF DESCRIPTION OF THE DRAWINGS

Preferred embodiments of the present disclosure can be understood in more detail from the following description taken in conjunction with the accompanying drawings of which.

DETAILED DESCRIPTION OF PREFERRED EMBODIMENTS

Preferred embodiments of the present invention will be described in more detail with reference to the accompanying drawings. The present invention may, however, be embodied in many different forms and should not be construed as limited to the embodiments set forth herein.

Referring to FIG. 1 to FIG. 4, an LCD 1 according to embodiments of the present invention comprises an LCD panel 100 on which an image is formed, a back light unit 300 disposed behind the LCD panel 100 and providing light to the LCD panel 100, and a top chassis 400 and a bottom chassis 500 disposed on the LCD panel 100 and behind the back light unit 300, respectively. The top chassis 400 and the bottom chassis 500 enclose the LCD panel 100 and the back light unit 300.

Figure 1:
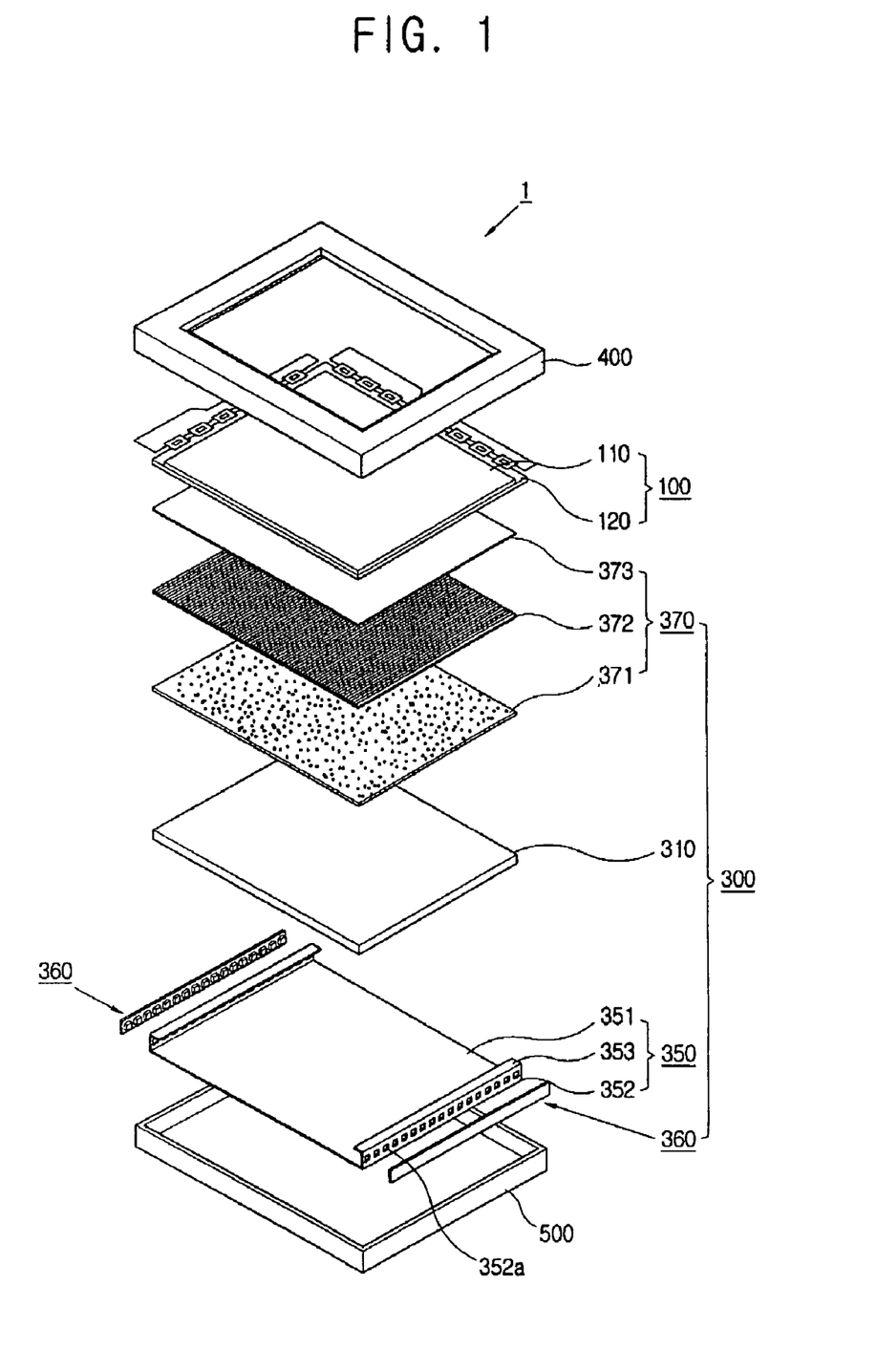
FIG. 1 is an exploded perspective view of an LCD according to an embodiment of the present invention.

The LCD panel 100 comprises a TFT substrate 110, a color filter substrate 120 and a liquid crystal layer (not shown) disposed therebetween.

The backlight unit 300 comprises a light guiding plate 310 disposed behind the LCD panel 100, a reflecting sheet 350 enclosing a part of the light guiding plate 310, an LED unit 360 disposed along at least one side of the light guiding plate 310 and providing light to the LCD panel 100, and optical sheets 370 disposed on the light guiding plate 310 for diffusing and focusing light guided by the light guiding plate 310.

The light guiding plate 310 may be square-plate shaped. The light guiding plate 310 comprises an incident surface 311 facing the LED unit 360 and on which light emitted from the LED unit 360 is incident, a reflective surface 312 forming a predetermined angle with the incident surface 311 and facing a first reflective surface 351 of the reflecting sheet 350, and an exiting surface 313 facing the LCD panel 100 and emitting light to the LCD panel 100.

A pair of the LED unit 360 are coplanar with each other at each side of the incident surfaces 311 of the light guiding plate 310. The LED unit 360 comprises a plurality of LEDs 362 and a substrate 361 supplying an electric signal to the plurality of LEDs.

Each LED 362 in the square shape includes a light guiding part (not shown) comprising red, green, blue chips and silicon and emitting white light toward the light guiding plate 310. The LEDs 362 emit light on the incident surface 311 of the light guiding plate 310.

The LEDs 362 in the LED unit 360 emit red, green and blue colors respectively so that the respective colors are mixed and may be incident on the light guiding plate 310.

Figure 2:
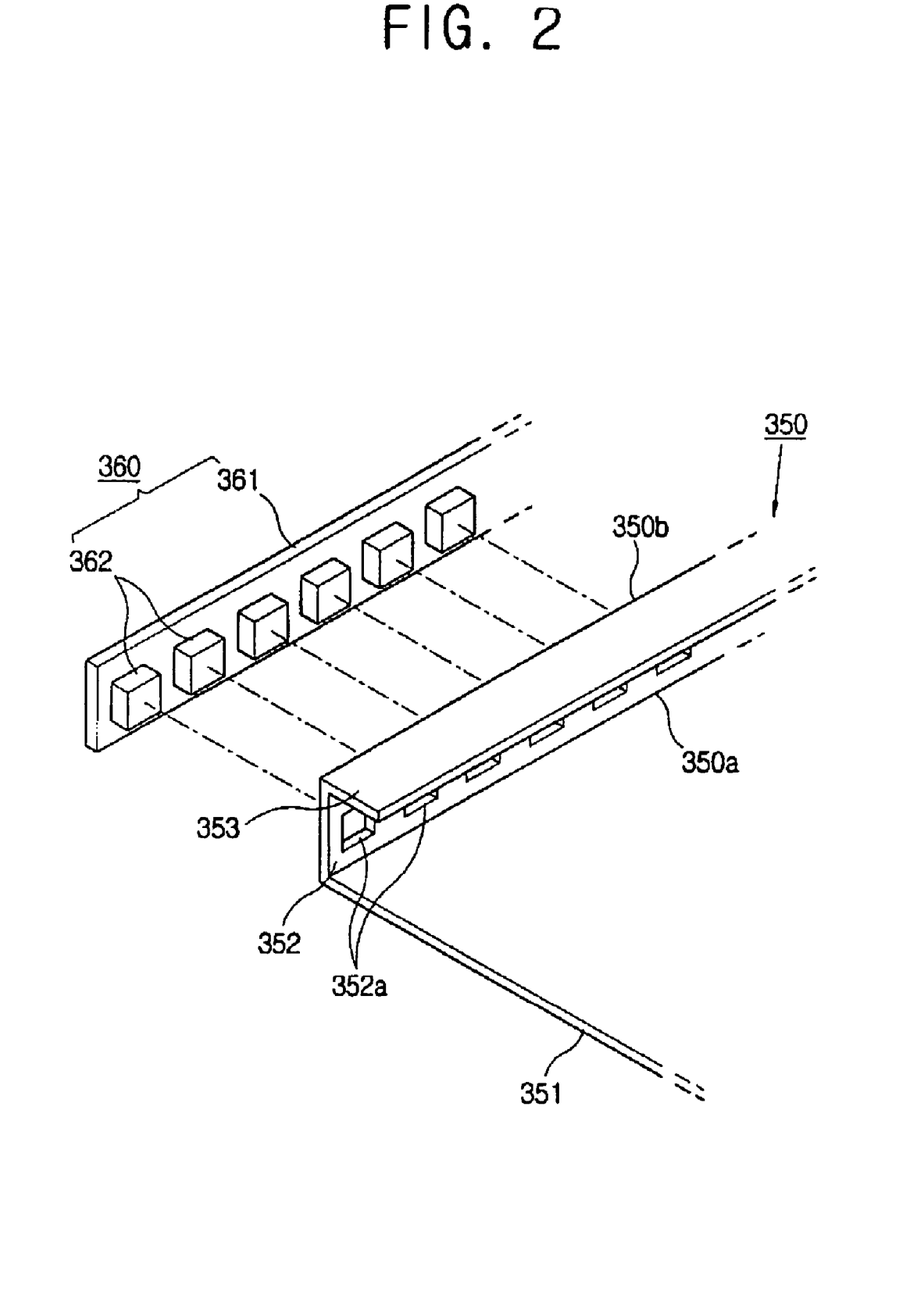
FIG. 2 is a perspective view of a reflecting sheet and an LED unit according to an embodiment of the present invention.

The reflecting sheet 350 may comprise polyethylene terephthalate (PET) and is used to decrease light loss by reflecting light, which leaks in the opposite direction of the LCD panel 100 among light emitted from the LED unit 360 to the light guiding plate 310. The reflecting sheet 350 comprises the first reflective surface 351 facing the reflective surface 312 of the light guiding plate 310, a second reflective surface 352 connected to each side of the first reflective surface 351 and receiving the LED unit 360, a third reflective surface 353 connected to each of the second reflective surface and covering an end portion of the exiting surface 313 of the light guiding plate 310. In an embodiment of the present invention, since the reflecting sheet 350 does not enclose the LED unit 360 while used for a conventional lamp holder, heat generated from the LED unit 360 can be easily dissipated to the outside through, for example, the bottom chassis 500.

The first reflective surface 351 reflects light leaking in the opposite direction of the LCD panel 100 among light emitted from the LED unit 360 to the light guiding plate 310, thereby improving a light efficiency.

The second reflective surface 352 improves the light efficiency by reflecting light, which is emitted from the light guiding plate 310 to the LED unit 360, to the light guiding plate 310. On the second reflective surface 352 are disposed a plurality of LED exposing parts 352a exposing the LEDs 362.

Figure 3:
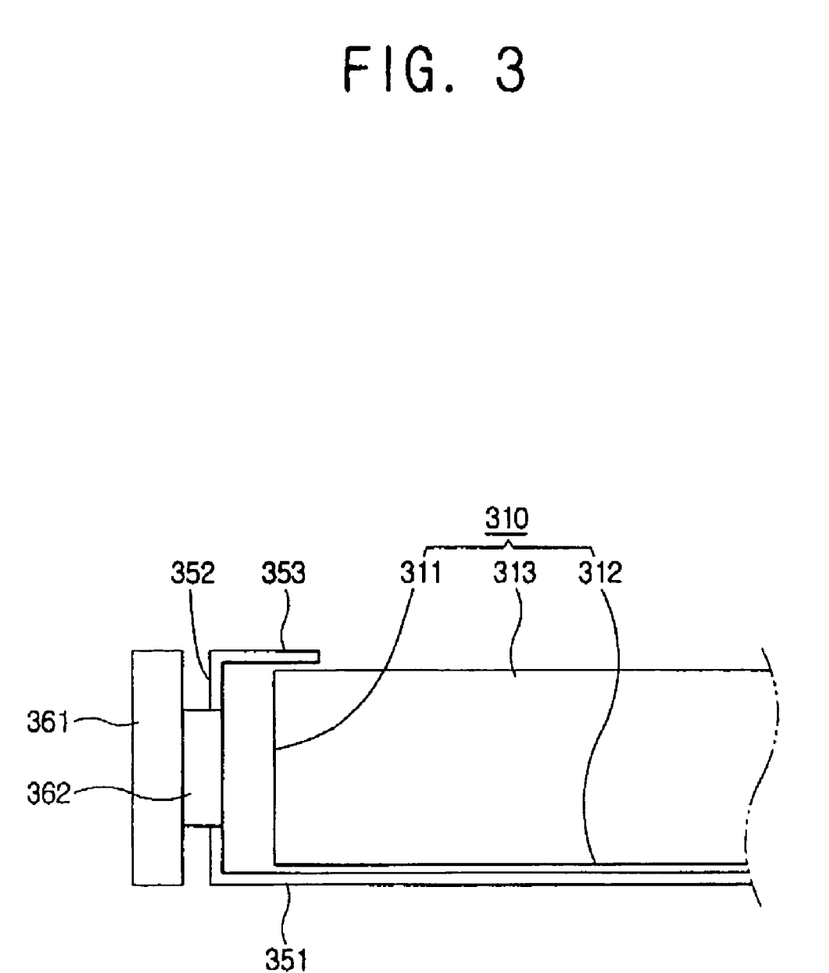
FIG. 3 is a cross-sectional view illustrating a location of an LED with respect to a reflecting sheet according to an embodiment of the present invention.
Figure 4:
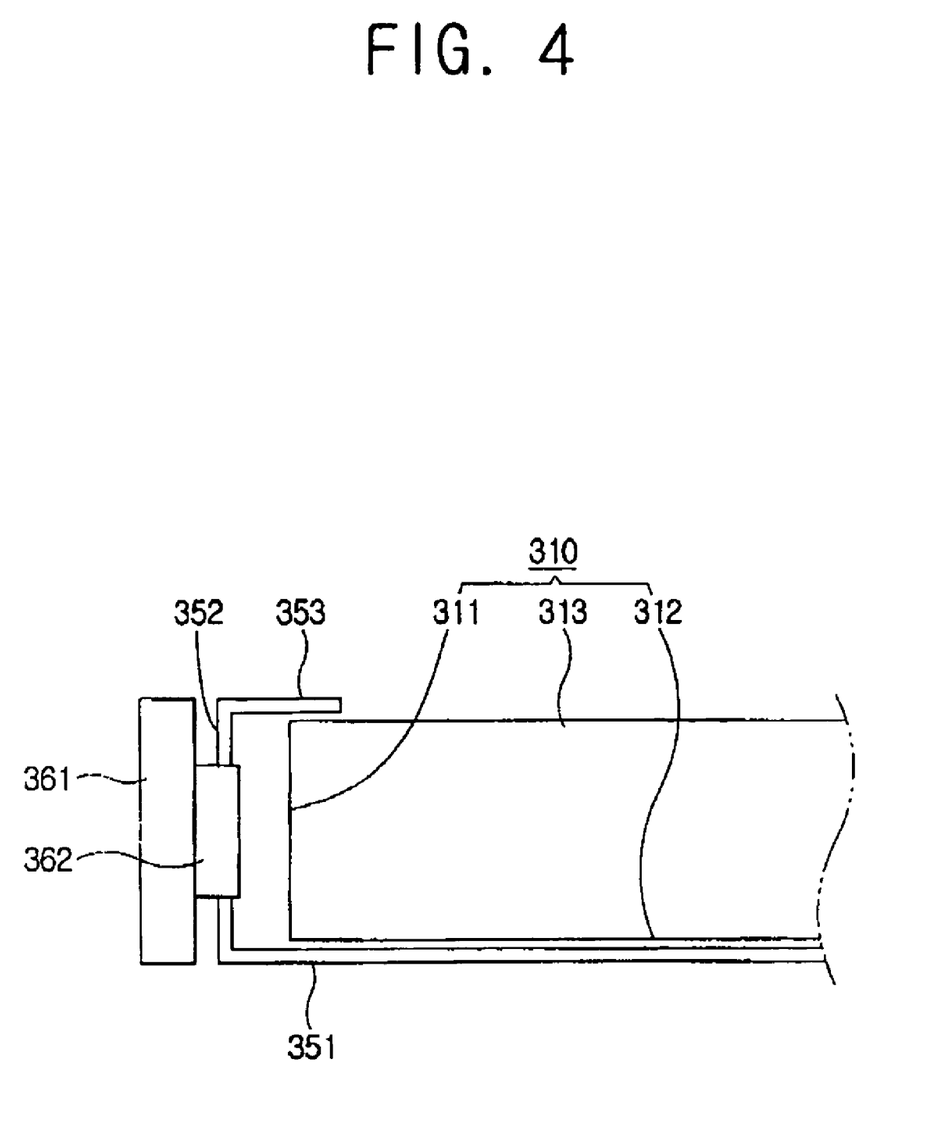
FIG. 4 is a cross-sectional view illustrating a location of an LED with respect to a reflecting sheet according to another embodiment of the present invention.

The LED exposing parts 352a are formed with holes in the square shape corresponding to the shape of LEDs 362. In an embodiment of the present invention, the LEDs 362 may fit in the LED exposing parts 352a to be aligned with an inside border of the LED exposing parts 352a as shown in FIG. 3. Alternatively, a part of the LEDs 362 may protrude beyond the holes toward the light guiding plate 310 as shown in FIG. 4. Therefore, the light efficiency may be improved since light emitted from the LEDs 362 is not intercepted by the second reflective surface 352.

To fit the LEDs 362 in the holes and align the LEDs on an inside border of the holes as shown in FIG. 3, on a surface of the bottom chassis 500 may be disposed a location deciding prominence (not shown) to determine a location of the LED unit 360.

The third reflective surface 353 covers the end portion of the exiting surface 313 of the light guiding plate 310 and reflects light emitted on the end portion of the exiting surface 313 of the light guiding plate 310 to the inside of the light guiding plate 310.

According to an embodiment of the present invention, the reflecting sheet 350 comprises, for example, a film type and further comprises folded lines 350a, 350b dividing the first reflective surface 351, the second reflective surface 352 and the third reflective surface 353. After the reflecting sheet 350 is shaped as shown in FIG. 2 by being folded along the folded lines 352a, 350b, the LED unit 360 is combined using the second reflective surface 352.

According to another embodiment of the present invention, the reflecting sheet 350 may be formed using a mold to eliminate a folding process, thereby improving a manufacturing efficiency. The reflecting sheet 350 may comprise a base comprising, for example, aluminum and a coating part coated with a reflective substance such as, for example, silver (Ag) or Titanium (Ti) on the base. The reflecting sheet 350 may further comprise the folded lines 352a, 350b similar to those in the film type and is formed by a folding device. Also, since the base comprises, for example, aluminum and heat generated from the LED unit 360 is easily dissipated, transformation of the reflecting sheet 350 by heat may be prevented.

Optical sheets 370 comprise a diffusion film 371 having a coating layer in the form of beads and diffusing light from the light guiding plate 310, a prism film 372 disposed on the diffusion film 371 and collecting light in the perpendicular direction on the LCD panel 100, and a passivation film 373 disposed between the LCD panel 100 and the prism film 372 for protecting the LCD panel 100.

According to an embodiment of the present invention, more than one diffusion films 371 may be used.

A couple of prism films 372, which comprise a regular prism and an inverse prism, can be used. Micro prisms formed on each prism film 372 form predetermined angles with each other. Accordingly, light incident from the diffusion film 371 progresses vertically on the LCD panel 100, thereby forming a uniform brightness distribution.

Figure 5:
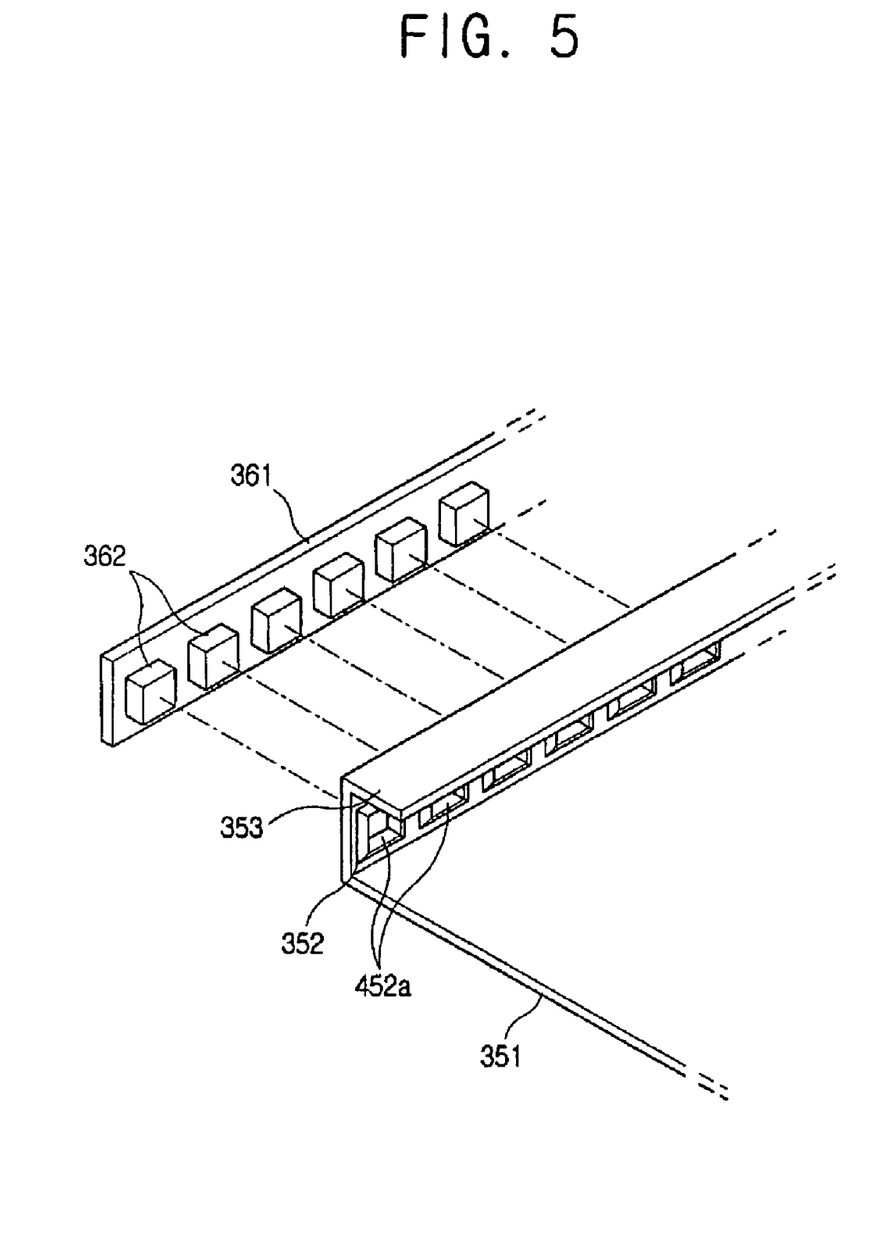
FIG. 5 is a perspective view of a reflecting sheet and an LED unit according to an embodiment of the present invention.
Figure 6:
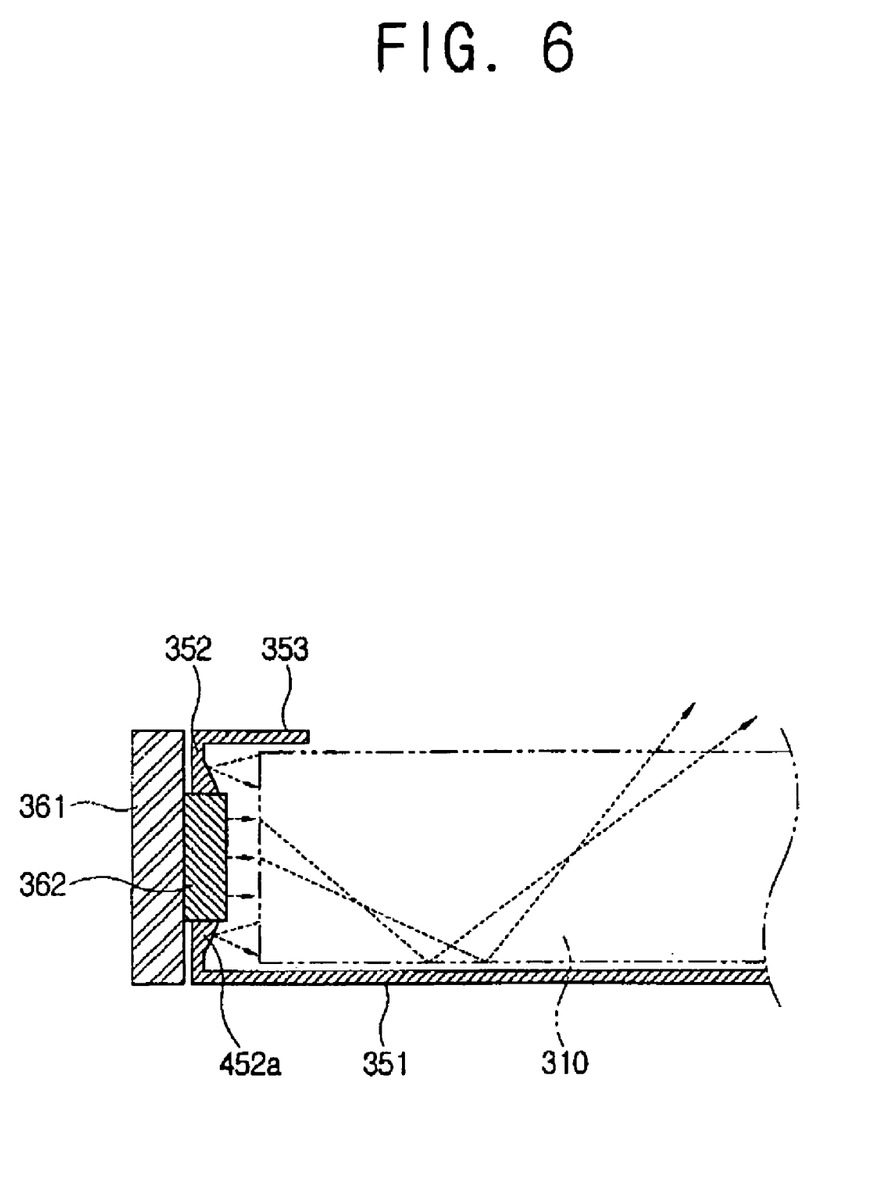
FIG. 6 is a cross-sectional view illustrating an LED unit and a reflecting sheet according to another embodiment of the present invention.

Referring to FIGS. 5 and 6, LED exposing parts 452a are projected from the second reflective surface 352 toward the light guiding plate 310. The LED exposing parts 452a are formed in a substantially quadrangular pyramid shape such that the second reflective surface 352 has a larger reflecting area than when the LED exposing parts 452a are formed in the square shape shown in FIG. 2. Thus, light incident on the light guiding plate 310 is more efficient, thereby reducing the light leaking. End parts of the LEDs exposing parts 452a seal around the circumference of the LEDs 362, thereby preventing the LED unit 360 from moving. The circumference of the LEDs 362 is sealed efficiently when the reflecting sheet 350 is formed using a mold and/or comprising aluminum and a reflecting substance.

Figure 7:
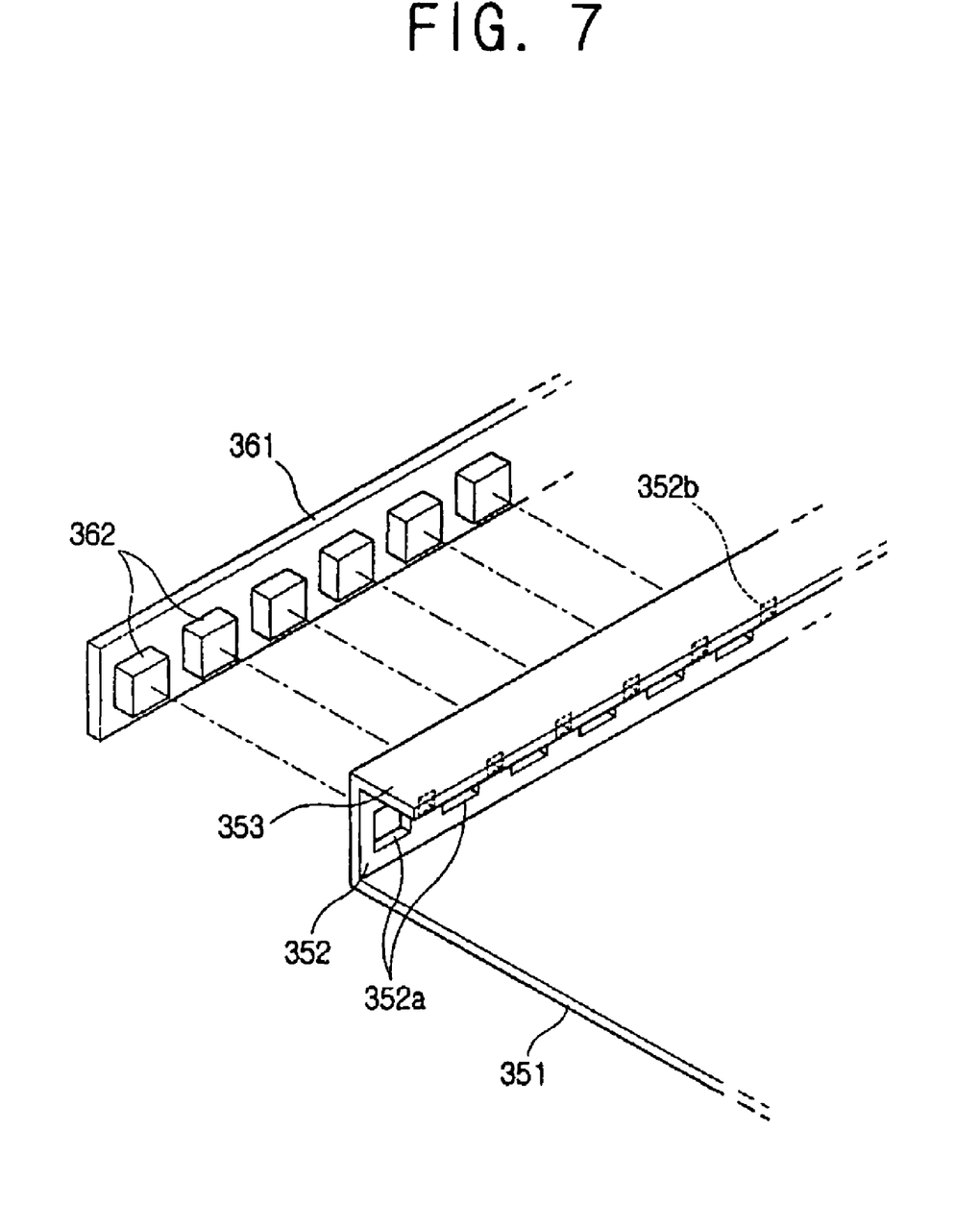
FIG. 7 is a perspective view of a reflecting sheet and an LED unit according to another embodiment of the present invention.
Figure 8:
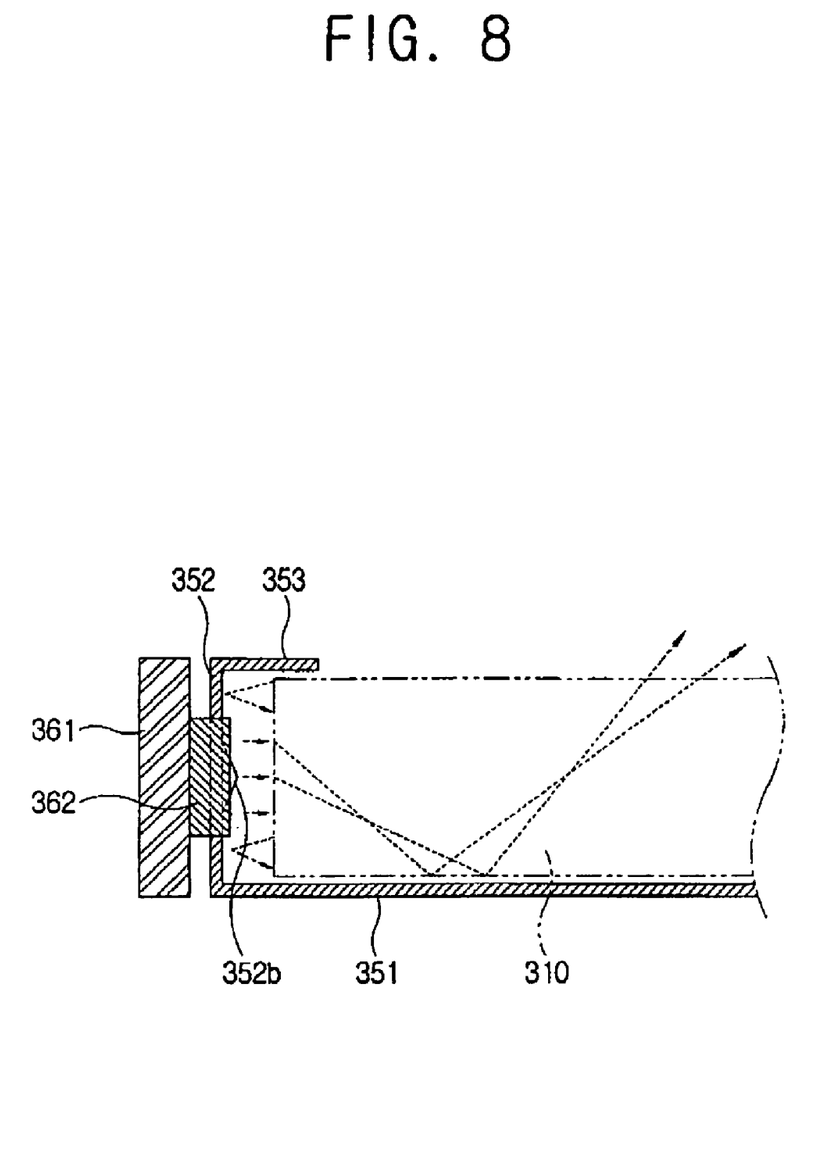
FIG. 8 is a cross-sectional view illustrating an LED unit and a reflecting sheet according to another embodiment of the present invention.

Referring to FIGS. 7 and 8, projections 352b are formed between the respective LED exposing parts 452a formed on the second reflective surface 352. Accordingly, light received in the LED unit 360 direction from the light guiding plate 310 may return to the light guiding plate 310 by being collected, diffused or reflected using the projections 352b. According to embodiments of the present invention, the projections 352b include, for example, a prism, a round or a square shape projection. The projections 352b protrude beyond the LEDs 362, and face the incident surface 311 of the light guiding plate 310 when the LED unit 360 combines with the reflecting sheet 350 as shown FIG. 8.

Figure 9:
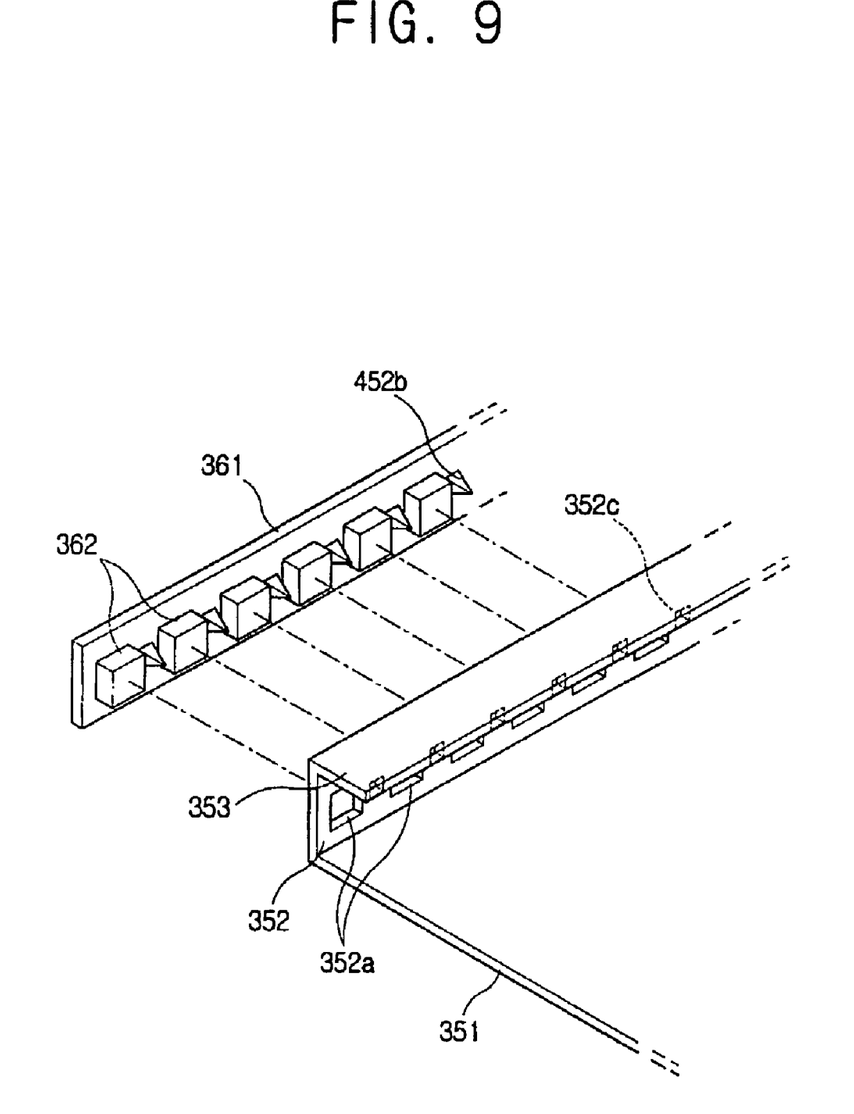
FIG. 9 is a perspective view of an LED unit and a reflecting sheet according to another embodiment of the present invention.

Referring to FIG. 9, projections 452b are disposed in the LED unit 360. The projections 452b are formed between each LED 362 in the LED unit 360. The projections 452b are disposed facing the incident surface 311 of the light guiding plate 310. The projections 452b pass through corresponding through holes 352c formed on the second reflective surface 352 of the reflecting sheet 350. Accordingly, the light received in the LED unit 360 direction from the light guiding plate 310 may return to the light guiding plate 310 by being collected, diffused and/or reflected by the projections 452b.

According to an embodiment of the present invention, the reflecting sheet 350 may comprise without the third reflective sheet 353.

Although preferred embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A backlight unit for use in a liquid crystal display, the backlight unit comprising:
   a light guiding plate comprising a light exiting surface, a light reflective surface, and a light incident surface;
   a light source unit comprising a substrate and a light source disposed on the substrate, wherein the light source unit is disposed to face the light incident surface of the light guiding plate; and
   a reflecting sheet comprising a first portion facing the light reflective surface of the light guiding plate, a second portion facing the light exiting surface of the light guiding plate, and a third portion connecting the first and the second portions, wherein the third portion comprises light source exposing parts,
   wherein the light source comprises a plurality of light emitting diodes, and each of the light emitting diodes is square shaped, and a portion of each corresponding light source exposing part is shaped in a quadrangular pyramid to receive the corresponding light emitting diode.

2. The backlight unit of claim 1, wherein the light source exposing parts protrude toward the light incident surface of the light guiding plate.

3. The backlight unit of claim 2, wherein the light source exposing parts are configured and dimensioned to seal around the circumference of the light emitting diodes.

4. The backlight unit of claim 1, wherein the light emitting diodes are disposed in the light source exposing parts and an end of each light emitting diode is aligned with an end of each light source exposing part when the light source unit is combined with the reflecting sheet.

5. The backlight unit of claim 1, wherein at least a part of the light emitting diodes protrudes beyond the light source exposing parts toward the light guiding plate when the light source unit is combined with the reflecting sheet.

6. The backlight unit of claim 1, wherein the light source exposing parts are formed with holes corresponding to the light emitting diodes, and projections protruding toward the light guiding plate are formed between each pair of light source exposing parts.

7. The backlight unit of claim 6, wherein the projections protrude beyond the light emitting diodes when the light source unit is combined with the reflecting sheet.

8. The backlight unit of claim 1, wherein the reflecting sheet is formed using a mold.

9. The backlight unit of claim 8, wherein the reflecting sheet comprises a base having aluminum and a coating part comprising a reflective substance, wherein the coating part is formed on the base.

10. The backlight unit of claim 1, wherein the light source unit further comprises projections disposed between each pair of light emitting diodes.

11. The backlight unit of claim 10, wherein the projections are disposed facing the incident surface of the light guiding plate and passing through a plurality of holes formed on the third portion of the light guiding plate.

12. The backlight unit of claim 1, wherein the substrate of the light source unit extends parallel to the incident surface of the light guiding plate.

13. A liquid crystal display comprising:
- a liquid crystal display panel on which an image is formed;
- a light guiding plate disposed behind the liquid crystal display panel and comprising a light exiting surface, a light reflective surface, and a light incident surface;
- a light source unit comprising a substrate and a light source disposed on the substrate, wherein the light source unit is disposed to face the light incident surface of the light guiding plate and the light source comprises a plurality of light emitting diodes; and
- a reflecting sheet comprising a first portion facing the light reflective surface of the light guiding plate and a second portion connected to the first portion,
- wherein the second portion comprises light source exposing parts,
- wherein each light source exposing part receives a light emitting diode and projects toward the light incident surface.

14. The liquid crystal display of claim 13, wherein the reflecting sheet further comprises a third portion that is connected to the second portion for covering a part of the light exiting surface of the light guiding plate.

15. The liquid crystal display of claim 13, wherein each of the light emitting diodes is square shaped, and a portion of each corresponding light source exposing part is shaped in a quadrangular pyramid to receive the corresponding light emitting diode, and wherein each light source exposing part is configured and dimensioned to seal around the circumference of the light emitting diodes.

16. The liquid crystal display of claim 13, wherein the light emitting diode exposing parts are formed with holes corresponding to the light emitting diodes, and wherein projections protruding toward the light guiding plate are formed between each light source exposing part.

17. The liquid crystal display of claim 13, wherein the reflective sheet is formed using a mold.

18. A backlight unit for use in a liquid crystal display, the backlight unit comprising:
- a reflecting sheet for receiving a light source and a light guiding plate,
- wherein the reflecting sheet comprises a first portion for receiving a first surface of the light guiding plate and a second portion connected to the first portion, and wherein the second portion comprises a plurality of holes to receive and expose the light source, wherein the second portion comprises projections each protruded toward a second surface of the light guiding plate.

19. The backlight unit of claim 18, wherein the reflecting sheet comprises a base and a coating part disposed on the base.

20. The backlight unit of claim 19, wherein the base comprises aluminum and the coating part comprises silver or titanium.

21. The backlight unit of claim 18, wherein the projections of the second portion are formed between each pair of the plurality of holes.

22. The backlight unit of claim 18, wherein the light source comprises a plurality of light emitting diodes.

* * * * *